Aug. 28, 1928. 1,682,649
J. L. WELLER
GRINDSTONE AND METHOD OF MAKING SAME

Filed Dec. 11, 1926

INVENTOR
J. L. Weller.
BY
ATTORNEYS

Patented Aug. 28, 1928.

1,682,649

UNITED STATES PATENT OFFICE.

JOHN L. WELLER, OF HAMILTON, ONTARIO, CANADA.

GRINDSTONE AND METHOD OF MAKING SAME.

Application filed December 11, 1926. Serial No. 154,277.

In the manufacture of artificial grindstones, especially those of large size, difficulty has been experienced owing to the fact that small sized aggregate, such as sand, must be used in order to obtain the necessary grinding qualities, this fine aggregate being held together by a considerable quantity of very strong cementing material. The result of this is that the excessive amount of cementing material in setting up and hardening from its plastic condition, becomes subject to excessive shrinkage and develops within the stone severe internal stresses which make the finished article uncertain in strength and liable to go to pieces under changes of heat or moisture content.

It has been found that the addition of considerable quantities of coarser aggregate in the mixture minimizes these stresses and makes a much stronger stone, but any ordinary coarse aggregate destroys the proper grinding qualities of the stone.

The object of this invention is to produce an artificial grind-stone of large size, possessing a minimum of internal stresses and consequently of maximum strength and uniformity in its grinding qualities.

The accompanying drawings illustrate a stone produced in accordance with my invention, in which.

Figure 1:
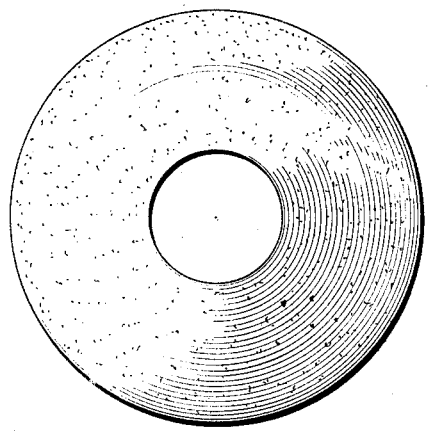
Figure 1 represents a side elevation of the stone.
Figure 2:
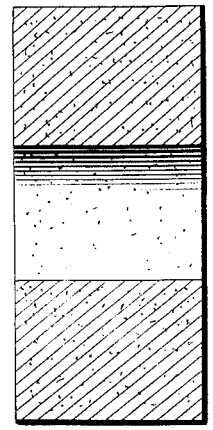
Figure 2 is a cross section of the stone through the center thereof.

The invention consists in mixing the desired abradant grains or particles with cement or other appropriate binder in proportions to form an article of the desired grinding qualities, and allowing the mixture to set to its maximum hardness. The resultant mass is then broken into such sizes as will make the proper coarse aggregate, which is desired for producing the final stone.

A second plastic mixture of abradant and binder is prepared in exactly the same manner as was used in making the first mixture mentioned above, and the broken aggregate is added to this second mixture so that the voids in the said broken aggregate are filled with the plastic material.

This plastic material constitutes about one-third of the total mass, and is evenly distributed therethrough.

It will thus be seen that in making an artificial grinding stone a quantity of plastic material sufficient only to fill the voids in the broken aggregate is required and this is evenly distributed throughout the mass so that the whole sets with very little shrinkage and consequently without developing undue internal stresses. Thus the completed stone being of the same mixture throughout will always present a true and homogeneous grinding face.

It has also been found that the grinding qualities of certain natural stones can be reproduced by careful blending of selected sand grains and cement in varying proportion to suit the particular stone being reproduced.

Therefore to make an artificial grindstone, natural stone may be crushed or broken up into a coarse aggregate and this aggregate mixed with a plastic binder of sand and cement as above described, using such quantity of this plastic binder as will fill all the voids in the coarse aggregate.

When molded into shape and fully hardened this stone will always present a grinding face of satisfactory quality as the natural stone pieces in the coarse aggregate and the hardened binder between them will wear away evenly.

It will be seen that the invention covers both stones made with ordinary cold setting cements, and those which are hardened by heat and which are composed of hard abrasive particles held together by some cementing material which requires considerable heat to solidify the mass. These features of novelty are recited in the appended claims.

I claim:—

1. The method of producing abrasive stones consisting of preparing a plastic mixture having abrasive qualities, then permitting the mixture to dry to produce a hardened body, then disintegrating the body, and finally incorporating the particles of the disintegrated body in a plastic mixture identical to the original plastic mixture which upon hardening produces an abrasive stone free from voids and internal stresses.

2. A method of producing abrasive stones which consists in taking a material having substantially the desired grinding qualities of the finished stone, crushing it to form a coarse aggregate; forming a plastic, self-setting, cementitious mixture, adapted when set to possess substantially the same grinding qualities as the material employed for the aggregate; mixing the aggregate with sufficient of the plastic mixture to fill all voids; and effecting the setting of the mixed mass, whereby a stone is formed substantially uniform throughout in its abrasive qualities and free from internal stresses.

3. An artificial abrasive stone comprising a coarse aggregate of a material having substantially the desired grinding qualities of the finished stone; and a binder of a cementitious mixture including abrasive grains and having substantially the same grinding qualities as the aggregate, the stone being substantially uniform throughout in its abrasive qualities and free from internal stresses.

JOHN L. WELLER.